April 25, 1933.　　P. S. EDWARDS ET AL　　1,905,349
DIRECT READING CAPACIOMETER
Filed June 7, 1929
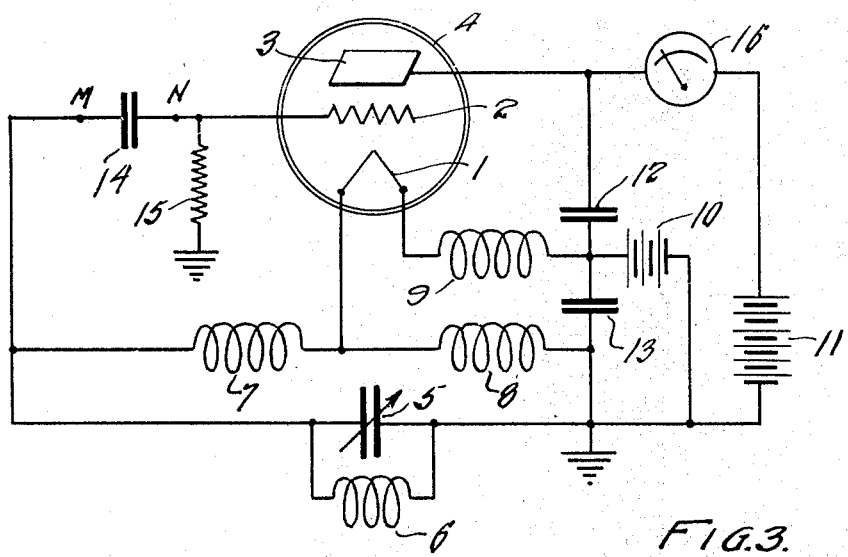
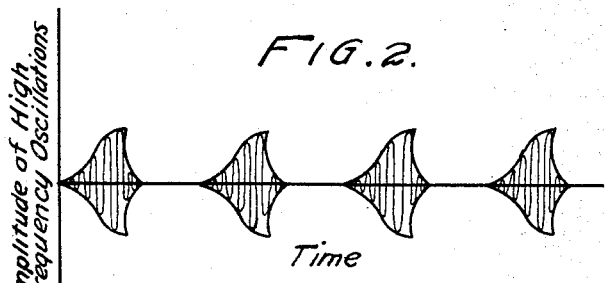
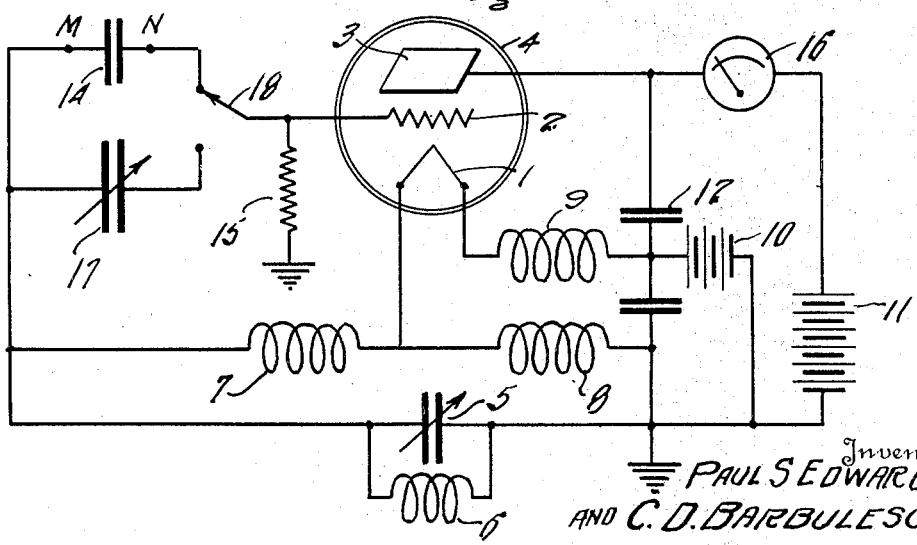

Patented Apr. 25, 1933

1,905,349

UNITED STATES PATENT OFFICE

PAUL S. EDWARDS AND CONSTANTIN D. BARBULESCO, OF DAYTON, OHIO

DIRECT READING CAPACIOMETER

Application filed June 7, 1929. Serial No. 369,232.

(GRANTED UNDER THE ACT OF MARCH 3, 1883, AS AMENDED APRIL 30, 1928; 370 O. G. 757)

The invention described herein, if patented, may be manufactured and used by or for the Government for governmental purposes, without the payment to us of any royalty thereon.

This invention relates in general to electrical measuring instruments and more particularly to a method and apparatus for measuring capacitances by direct reading of an indicating instrument.

Heretofore the measurement of capacitors has involved as a general rule complicated bridge arrangements and necessitated careful adjustment and rather extensive computation to attain the final result.

The major object of the present invention is to avoid all such complicated methods of measurement by providing an apparatus whereby the capacity of a given element may be immediately read or indicated in a single instrument.

Another object is to provide an apparatus in which the capacity of a given capacitor may be indicated directly in microfarads.

A further object is to provide a device of the character described in which the capacity of a given element may be quickly indicated without resorting to mathematical calculations.

In order to more clearly explain the invention, preferred mechanical embodiments of it are shown in the accompanying drawing, in which:

Fig. 1 is a diagrammatic illustration of the general circuit employed.

Fig. 2 is a schematic view of the operation of certain portions of the circuit.

Fig. 3 is an illustration of the plate current characteristic of the tube.

Fig. 4 is a modification of the form of the invention shown in Fig. 1.

The present invention is a continuation in part of application Serial No. 305,753, filed September 13, 1928.

As indicated above, the determination of the capacity of a given element has involved considerable mathematical calculations. The results obtained are not always precisely accurate because of the necessity of assuming the constancy of certain factors, such as the thickness of the dielectric and the uniformity of the dielectric constant. Furthermore the calculations may become rather extensive as in the case of the determination of the capacity of variable condensers which comprise semi-circular plates, or more particularly the determination of the capacity of the so-called straight line condensers.

In accordance with the present invention the actual capacity is tested and measured without regard to the particular variation of any one of the elements invloved. This is accomplished by interposing the element, the capacity of which is to be tested, in a circuit of great sensitivity and indicating the capacitance by a plate current reading.

As disclosed in Fig. 1, the instrument embodying the principles of the present invention comprise a vacuum tube including the filament 1, grid 2 and plate 3. As shown, these are enclosed in an evacuated envelope or container 4 in the usual manner. Connected to the tube is a low loss circuit comprising a large capacity 5 and small inductance 6. This circuit, known as a low loss tank circuit, largely controls the frequency at which the tube oscillates, as explained fully in the prior application.

Conductively associated with the filament 1 are the high frequency choke coils 7 and 8. These are composed of a relatively large number of turns of wire and are included respectively in the grid and plate circuits of the tube. In operation these choke coils induce two driving electromotive forces which are substantially 180° out of phase. The choke coil 9, similar in construction to the coils 7 and 8, serves to maintain the filament 1 at a high potential with respect to the ground. In operation, the geometric sum of the electromotive forces produced by the choke coils maintains a heavy oscillating current in the tank circuit.

The power supply of the tube comprises a filament battery 10 and a plate battery 11, both of which are maintained, as shown, at ground potential. The numerals 12 and 13 indicate bypass condensers of large value for the high frequency currents circulating in the plate current.

The frequency of the oscillations of the tube is controlled mainly by the value of the condenser 5 and inductance 6. Inasmuch as the condenser is of a large value, the inter-electrode capacity of the tube becomes relatively substantially negligible in effect and hence replacements of the tube or minor variations in the characteristic of a given tube during normal use will not appreciably effect the frequency of the oscillations generated. As a result the tube is peculiarly susceptible to extraneous or interposed electrical effects.

The grid circuit is provided with a blocking condenser 14 and a leak resistance 15. The value of the condenser 14 and resistance 15 is so chosen that the high frequency oscillations will periodically charge the condenser to a certain value and then discharge through the leak resistance to the ground. Therefore the condenser 14 and resistance 15, together with any other additional coupled capacitors or resistances, produce a periodic interruption of the high frequency oscillations. The period of the parasitic discharge is controlled by the time constant CR which may vary, depending on the values chosen, from a few cycles per second to several thousand or more.

The effect of the associated condenser and leak resistance is indicated schematically in Fig. 2, in which the shape of the modulated high frequency oscillation is shown. The periodic charge and discharge of the blocking condenser is indicated by the envelope of the amplitudes of the high frequency oscillations. As indicated above, the frequency of this periodic charge and discharge depends upon the chosen values of the condenser and leak resistance, assuming the other values of the circuit to be constant; hence for a given large value of the grid leak the frequency is low and the grid of the tube is strongly biased. The resultant plate current consequently is very small and will remain at this low value until some external or internal cause is made to effect the circuit.

Conversely, a decrease in the value of the grid resistance will tend to increase the frequency of the periodic discharge and since the amplitude of the high frequency oscillations cannot reach high values, the grid bias decreases with the resulting increase in plate current. Similarly a decrease in the value of the blocking condenser will have the same effect. In other words, the value of the blocking condenser may be varied to chop off high frequency oscillations and produce a strong negative bias on the grid of the tube.

This effect is shown schematically in Fig. 3 in which the operating point is indicated as being automatically shifted on the static characteristic of the tube toward the negative values of the grid voltage and the consequent plate current. As shown, when the operating point is at $a$ the corresponding plate current A is quite small in value as compared with the maximum or saturation current of the tube.

It will thus be seen that a variation in the value of the grid condenser is always accompanied by a corresponding variation in the plate current. This effect is due initially to the variation of the frequency of the periodic discharge, for as the frequency of this discharge increases, the duration of a complete charge and discharge is small and the amplitude of the high frequency oscillations does not reach a high value and the bias effect is therefore reduced. Concomitantly the plate current takes on a new value determined by the corresponding new value of the grid bias.

It will be perceived that if, in place of a given grid condenser 14, a set of condensers of well known value be inserted successively, the plate current indicated in the direct current meter 17 will have a corresponding and respectively different value and that this value, properly calibrated, is directly determinative the capacity of any given blocking condenser used in the grid circuit. In constructing the instrument such a method is followed.

The values for the known condensers which are employed for purposes of calibration are inscribed directly upon the scale of the direct current meter 16. This instrument therefore becomes a means of directly indicating the capacitance of any given element in terms of its ultimate value and this applies equally whether the elements to be tested comprise a simple parallel plate condenser, isolated thin circular disc, concentric spheres, or co-axial cylinders. In short, the instrument is capable of measuring precisely the actual capacity of any element which is desired to be tested. Furthermore, as will be appreciated, the instrument presents an excellent means of calibrating any type of variable condenser.

It will be appreciated that although the indicating meter 16 is shown as directly connected in the plate circuit, it may be utilized elsewhere; for example if desired the output circuit may be connected to amplifying stages and the indicating meter connected in the output circuit of the final amplifying stage.

It will be appreciated also that other specific methods of utilizing the principles involved in this invention may be employed.

An example of such is shown in Fig. 4. In this case the grid leak is connected to a switch 18 which is adapted to contact either with a variable condenser 17 or with the condenser of unknown value 14. The other portions of the circuit are similar to those described in Fig. 1. In the second method, employing the device shown in Fig. 4, the capacitor which is to be tested is inserted in the circuit by suitably connecting to the terminals M and N. The designation 14, it will be understood, indicates not only a single condenser but any arrangement of plural condensers. After the unknown condenser is interposed in the circuit as described, the input circuit through this element is closed by throwing the switch 18 to the terminal connected to the unknown condenser.

The interposition of this condenser in the circuit will, as described above, effect the parasitic oscillations in the input circuit and cause a corresponding variation in plate current. The reading on the meter 16 is therefore a direct function of the capacitance of the element 14. This reading is noted and the switch 18 then thrown to the terminal connected to the calibrated variable condenser 17. This variable condenser is then adjusted until the pointer on the meter 16 indicates the same value as was obtained upon the testing of the condenser 14.

Since the condenser 16 is calibrated in terms of capacity, the value of the unknown capacity may therefore read directly from this condenser. This method presents the advantage of permitting the utilization of an ordinary ammeter for the current indicating instrument 16 and also permits the use of the apparatus for other uses.

It will be appreciated that we have provided a capaciometer in which the value of an unknown capacitance may be quickly and accurately determined and which determination is not effected by any minor variations in the characteristics of the tube. Due to the very great sensitivity of the circuit, very small changes in capacitance may be measured and, as explained, the resultant plate current may be amplified to any desired degree. The device may be made up to include a specially calibrated dial as in Fig. 1, or may be employed with standard instruments available on the market.

While preferred embodiments have been shown and described, it is to be understood that these are given by way of explanation and are to be considered as illustrative and not restrictive.

We claim:

1. A capaciometer comprising a vacuum tube oscillator, means to connect a capacitor to be tested in the grid circuit of the oscillator, and means to directly indicate the value of the capacitor comprising a meter connected in the plate circuit of the tube.

2. A capaciometer comprising a vacuum tube oscillator having an associated low loss tank circuit, means to connect a capacitor to be tested in the grid circuit of the tube to thereby vary the value of the plate current and means to indicate such value of the plate current.

3. A capaciometer comprising a self-modulated oscillator including a vacuum tube and an associated low loss tank circuit, a capacitor connected to the grid of the tube, a leak resistance associated with the capacitor and a current meter connected in the plate circuit directly responsive to variations in the value of the capacitor.

4. A capaciometer comprising a vacuum tube and a low loss tank circuit coupled to the input circuit of the tube, means to modulate the high frequency oscillations at audible frequency including a condenser and leak resistance connected to the grid, a current meter connected in the plate circuit, calibrated in capacity units and adapted to directly indicate the capacitance of the condenser.

5. A capaciometer comprising a vacuum tube, a tank circuit including a large capacitor and small inductance connected to the input of the tube, means to connect a condenser to be tested in the grid circuit, a leak resistance associated with the condenser, a current meter calibrated in terms of capacitance connected in the plate circuit and adapted to indicate the value of the said condenser.

6. A capaciometer comprising a self-modulated vacuum tube oscillator, a current meter associated with the output of the tube, a resistance leak connected to the grid, a calibrated variable condenser and a fixed condenser arranged for successive connection to the grid and a switch adapted to connect one of the condensers to the grid.

7. A capaciometer comprising a vacuum tube having a filament, grid and plate, a tank circuit comprising a low resistance, large capacitance and low losses connected across the grid and plate, a coil between the filament and grid and a second coil between the filament and plate of the tube, means to connect a capacitor to be tested in the grid circuit of the tube and means to indicate the value of the capacitor comprising a meter connected in the plate circuit of the tube.

8. A capaciometer comprising a vacuum tube having a filament, grid and plate, a low loss tank circuit comprising a low inductance and large capacitance connected across the grid and plate, means producing high frequency oscillation in the tank circuit comprising two coils placed respectively between the filament and each of the cold electrodes of the tube, means for connecting a capacitor to be tested in the grid circuit of the tube and means to indicate the value of the capacitor comprising a meter connected in the plate circuit of the tube.

9. A capaciometer comprising a vacuum tube oscillator having an associated low-loss tank circuit, a resistance leak connected to the grid, a calibrated variable condenser and a fixed condenser arranged for successive connection to the grid, a switch adapted to successively connect the condensers to the grid and a meter associated with the output of the tube for indicating the capacity of the unknown condenser.

In testimony whereof we affix our signatures.

PAUL S. EDWARDS.
CONSTANTIN D. BARBULESCO.